Patented Nov. 12, 1940

2,221,623

UNITED STATES PATENT OFFICE 2,221,623

TREATMENT OF MANGANESE

Clarence Travis Anderson, Pittsburgh, Pa., assignor to Chicago Development Company, Chicago, Ill., a corporation of Illinois No Drawing. Application February 20, 1939, Serial No. 257,454

5 Claims. (Cl. 75—80)

This invention relates to the treatment of manganese and is particularly concerned with the removal of boron therefrom in order to provide a substantially pure manganese adapting it for the preparation of certain alloys in which boron is a deleterious constituent.

The presence of boron in manganese may be due to several causes. Although not a constituent of silico-thermic, alumino-thermic or electrolytic manganese, boron has been introduced therein in proportions of the order of about 0.1% up to several percent for the purpose of preparing manganese-base alloys containing boron or such introduction has occurred as an incident to the purification of electrolytic manganese to remove sulphur therefrom.

In accordance with my present invention, the boron, however it may have been introduced into the manganese, is effectively removed in a simple and inexpensive manner.

In general, the removal of the boron from the manganese containing the same is effected by mixing the latter, in the molten state, with an oxide of manganese, particularly manganese dioxide. In this manner, the boron may be removed to such an extent that it is below the point of accurate analytical determination.

The following examples are illustrative of my invention, although it will be appreciated that they are subject to variations with respect to temperatures and times of treatment without departing from the spirit of the invention and the novel teachings herein as defined in the appended claims.

Example I 50 pounds of electrolytic manganese, substantially free of sulphur but containing 0.7% boron, were melted in a high frequency induction furnace and mixed or agitated with 1 pound of manganese dioxide, the mass being maintained at a temperature of 1300 degrees C. to 1350 degrees C. for between 5 and 10 minutes. The manganese oxide slag was then removed and the metal cast into ingots. On analysis, the resulting manganese metal contained 0.007% boron.

Example II

In this example, employing the same materials and treatment period but utilizing a temperature of between 1400 degrees C. and 1500 degrees C., the boron content of the manganese metal was reduced from its original amount of 0.7% to 0.02%.

The melting of the manganese is preferably carried out in a highly dense alumina crucible although magnesia crucibles may be used in certain cases. If it is desired to avoid the introduction of silicon into the manganese, crucibles containing silica or silicates should be avoided or, in general, the melt should not be exposed in any way to contact with silica or silicates.

The proportions of oxides of manganese are subject to relatively wide variations. The proportions utilized depend, among other things, on the amount of boron present in the manganese, it being understood that the smaller the percentage of boron the less oxides of manganese will be required. In the average case, from 1% to 4% of a manganese oxide will be sufficient to achieve the desired results.

The temperature at which the manganese and the oxides of manganese are mixed is variable. It should not be so high as to cause undesired volatilization. About 1300 degrees C. to 1500 degrees C. represents a preferred working range.

It is frequently advantageous, in carrying out the process, to mix the oxide of manganese with a small amount of a fluxing material such as sodium carbonate, calcium carbonate or calcium fluoride. A good fluxing material may be prepared from approximately equal parts of sodium carbonate, calcium carbonate and calcium fluoride. In general, however, fairly satisfactory results are obtained without resorting to such practice.

What I claim as new and desire to protect by Letters Patent of the United States is:

1. The method of substantially reducing the boron content of manganese which comprises mixing the manganese, in molten condition, with an oxide of manganese for a period of time sufficient to effect the desired removal of the boron.

2. The method of substantially reducing the boron content of manganese which comprises mixing the manganese, in molten condition, with manganese dioxide for a period of time sufficient to effect the desired removal of the boron.

3. The method of reducing the boron content of manganese from approximately 0.1% or more to approximately 0.02% or less which comprises mixing the manganese, in molten condition, with an oxide of manganese for a period of time sufficient to effect the desired removal of the boron.

4. The method of claim 3 wherein the oxide of manganese is manganese dioxide and the temperature at which the reaction is conducted is between about 1300 degrees C. and 1500 degrees C.

5. The method of reducing the boron content of substantially sulphur-free manganese containing from about 0.1% to about several percent of boron which comprises mixing manganese dioxide with said manganese while maintaining the latter in a molten condition, and then removing the slag from the metal.

C. TRAVIS ANDERSON.